United States Patent
Sugiyama et al.

[15] 3,652,930
[45] Mar. 28, 1972

[54] RATIO MEASURING APPARATUS

[72] Inventors: Takashi Sugiyama; Satoshi Kurata; Hisao Nakane, all of Tokyo, Japan

[73] Assignee: Yokogawa Electric Works, Ltd., Tokyo, Japan

[22] Filed: Mar. 2, 1970

[21] Appl. No.: 15,500

[30] Foreign Application Priority Data

Mar. 6, 1969 Japan....................................44/17060
Mar. 6, 1969 Japan....................................44/17061
Sept. 26, 1969 Japan....................................44/76784

[52] U.S. Cl..................................324/57, 324/59, 324/60, 324/62, 328/161, 235/184
[51] Int. Cl......................................G01r 27/00, G06g 7/16
[58] Field of Search..................324/57, 57 A, 57 NB, 59, 60, 324/62, 83 FE

[56] References Cited

UNITED STATES PATENTS 2,967,997  1/1961  McCoy................................324/57 X
3,177,347  4/1965  Cowley..............................324/57 NB

OTHER PUBLICATIONS

" Phase Separator Using Feedback Techniques," by A. D. Heibel, May, 1966 Instrument & Control Systems p. 143 & 144, Vol. 39

Primary Examiner—Herman Karl Saalbach
Assistant Examiner—Saxfield Chatmon, Jr.
Attorney—Chittick, Pfund, Birch, Samuels & Gauthier

[57] ABSTRACT

Ratio measuring apparatus adapted to measure various parameters of impedance elements is comprised by a multiplier energized by a divisor signal, and an integrator supplied with a dividend signal and the output from the multiplier. A portion of the output from the integrator is fed back to the multiplier so that the integrator provides an output proportional to the ratio between the dividend signal and the divisor signal.

7 Claims, 9 Drawing Figures

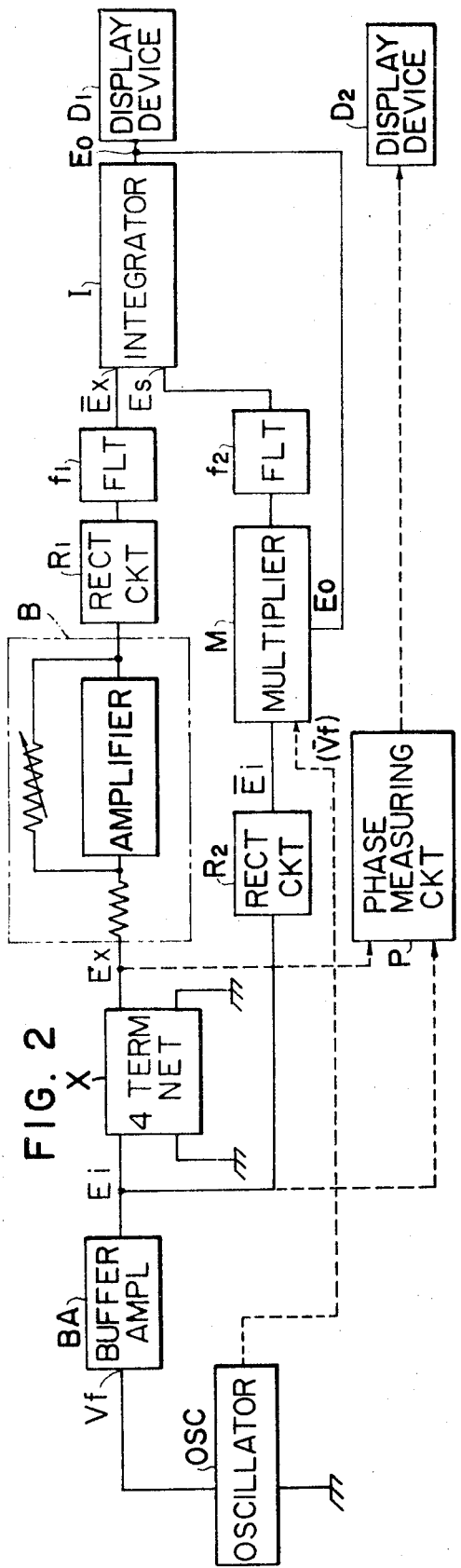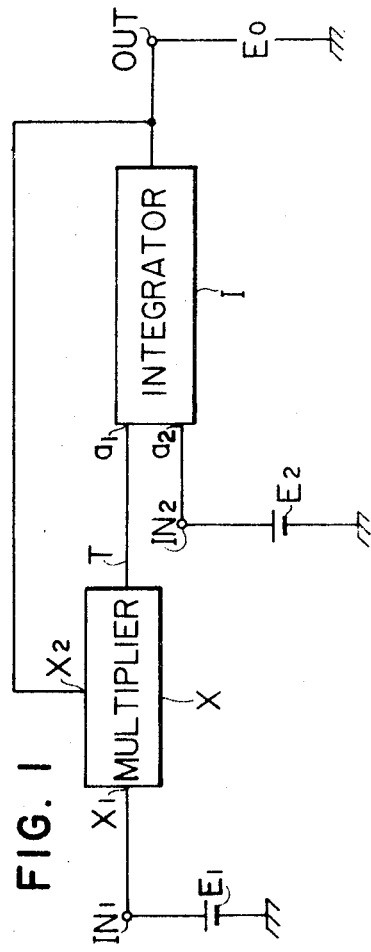

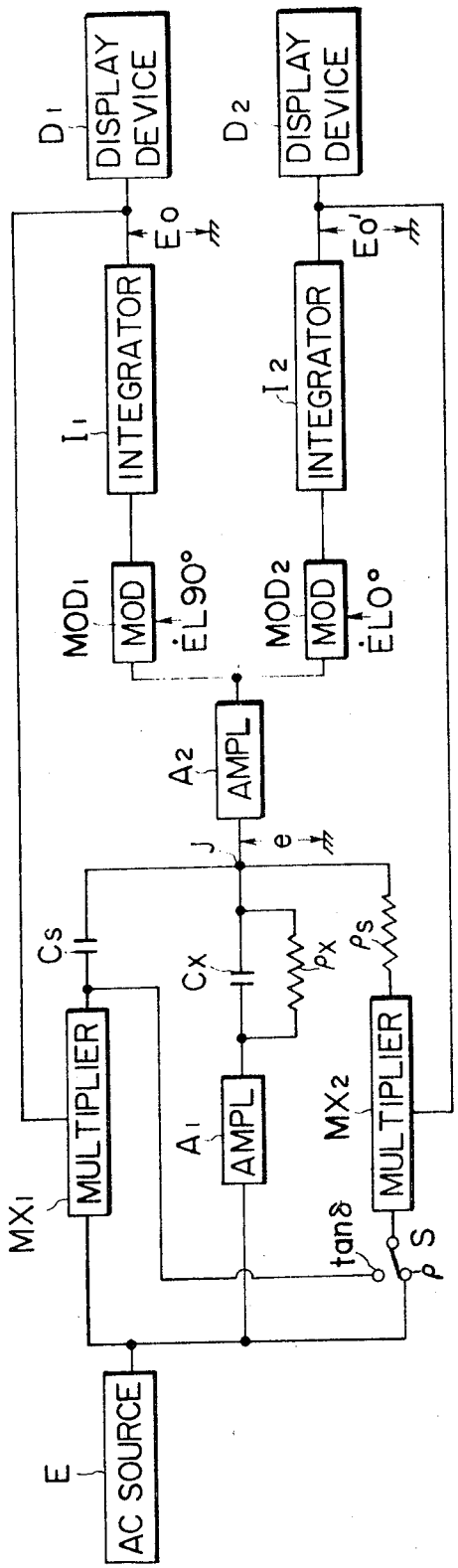
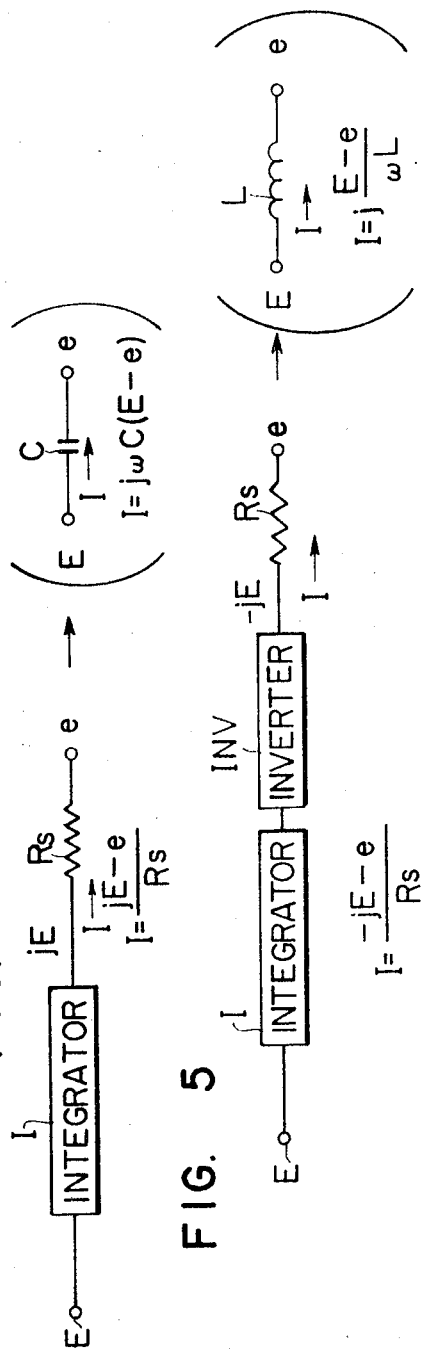
FIG. 3
FIG. 4
FIG. 5
TAKASHI SUGIYAMA
SATOSHI KURATA    INVENTORS
HISAO NAKANE

TAKASHI SUGIYAMA
SATOSHI KURATA    INVENTORS
HISAO NAKANE

By Chittick, Pfund, Birch,
Samuels & Gauthier
ATTORNEY

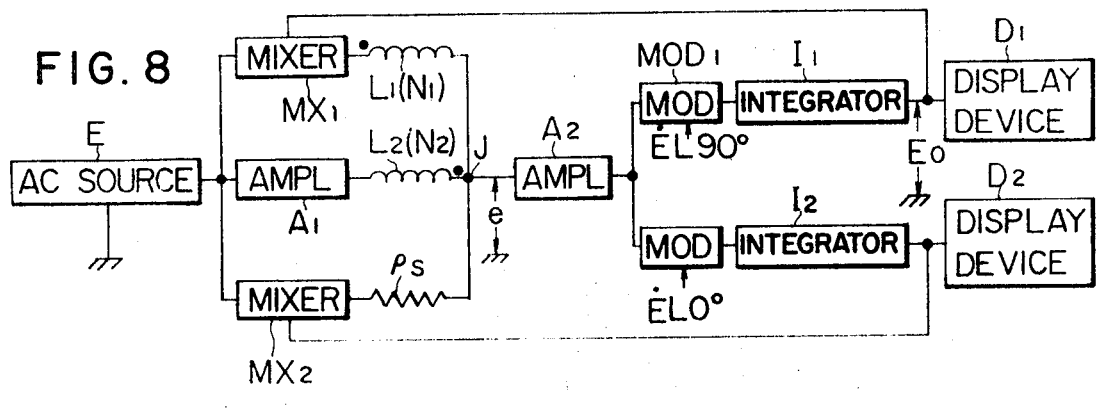
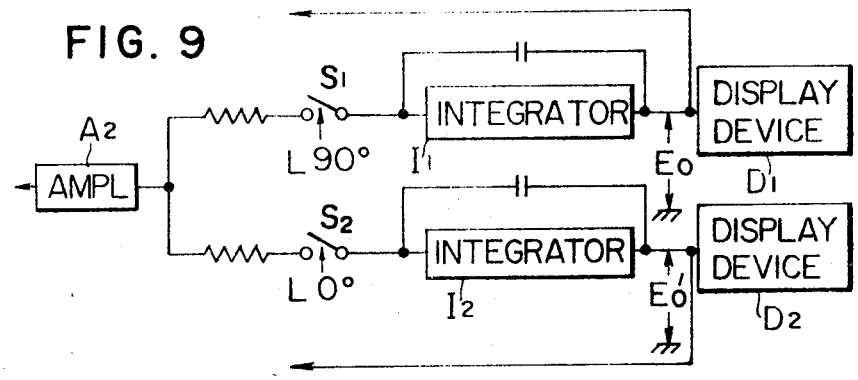

RATIO MEASURING APPARATUS

BACKGROUND OF THE INVENTION

This invention relates to a ratio measuring apparatus to measure the ratio between two input signals.

The ratio between two input signals can be obtained by utilizing an amplifier having a multiplier in its feedback circuit, determining the product of two signals by the operation of the multiplier, and determining a negative function of the product by the amplifier. With this method however, unless the gain of the amplifier is controlled in accordance with the signal level, the operation of the amplifier becomes unstable thus making it difficult to obtain accurate result of measuring.

SUMMARY OF THE INVENTION

It is therefore an object of this invention to provide a new and improved ratio measuring apparatus capable of providing accurate and stable measurements without being affected by the gain of the amplifier.

A further object of this invention is to provide a measuring apparatus which can measure automatically the ratio between an input voltage and an output voltage, for example the transmission characteristics of four terminal circuit networks.

In the prior apparatus for measuring the transmission characteristics of four terminal circuit networks it is necessary to rely upon manual operation to obtain measured values, so that such apparatus are not efficient to quickly measure and test circuit components which are produced on the mass production basis. In contrast the novel measuring apparatus is advantageous in that it is possible to quickly determine the transmission characteristics of four terminal circuit networks without utilizing any manual operations so that the novel apparatus is especially suitable to measure and test circuit components and the like which are produced on the mass production basis.

Another object of this invention is to provide an impedance measuring apparatus of the automatic balancing type utilizing solid state elements and having extremely rapid measuring speed.

Impedance elements such as capacitors are manufactured on the mass production basis so that in order to determine whether they have rated characteristics or not it is necessary to use an impedance measuring apparatus having high measuring speed. The invention contemplates the provision of such high speed measuring apparatus.

Broadly speaking this invention provides a ratio measuring apparatus comprising a multiplier, means to apply a divisor signal to one input terminal of the multiplier, an integrator, means to apply a dividend signal to one input terminal of the integrator, means to apply the output from the multiplier to the other input terminal of the integrator, means to feedback the output from the integrator to the multiplier and means to measure the output from the integrator.

BRIEF DESCRIPTION OF THE DRAWINGS

Further object and advantages of this invention can be more fully understood from the following detailed description taken in conjunction with the accompanying drawing in which:

FIG. 1 is a block diagram showing the basic construction of the novel measuring apparatus;

FIGS. 2 and 3 are block diagrams of two preferred embodiments of this invention;

FIGS. 4 and 5 show block diagrams of examples of circuit elements utilized in the circuit shown in FIG. 3;

FIGS. 6, 7 and 8 are block diagrams of other modified embodiments of this invention; and FIG. 9 shows a modified circuit element which can be used in either one of FIG. 3, FIG. 6, FIG. 7 and FIG. 8.

DESCRIPTION OF THE PREFERRED EMBODIMENTS

Figure 6:
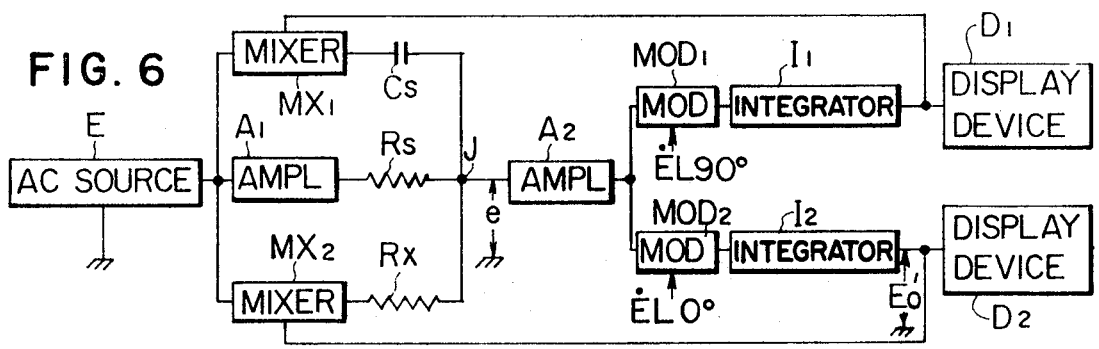

Referring now to FIG. 1 of the accompanying drawing there is shown a block diagram of the basic construction of the novel ratio measuring apparatus comprising a multiplier X performing a multiplying operation of two input signals impressed upon two input terminals $x_1$ and $x_2$ to provide the result of the operation at an output terminal T. The output is supplied to an integrator I provided with an input $a_2$ connected to terminal $IN_2$ for receiving an dividend signal and an output terminal OUT for a measured signal.

Input terminal $IN_1$ for a divisor signal is connected to the input terminal $x_1$ of the multiplier X while the output terminal T thereof is connected to an input terminal $a_1$ of the integrator I. The output terminal OUT of integrator I is connected to another input terminal $x_2$ of the multiplier to feedback thereto a portion of the output from the integrator.

The ratio measuring apparatus described above operates as follows:

Assume now that a voltage $E_0$ is produced at output terminal OUT of integrator I when a voltage $E_1$ is impressed upon input terminal $IN_1$ as the dividend signal and a voltage $E_2$ is impressed upon input terminal $IN_2$ as the divisor signal. Then, as a portion of the output voltage $E_0$ is fed back to input terminal $x_2$ of the multiplier X, an output voltage corresponding to the product $E_1 \cdot E$ of voltage E, applied to input terminal $x_1$ as the divisor signal and output voltage $E_0$ will appear on the output terminal T of multiplier X which is coupled to the input terminal $a_1$ of integrator I. As a result, the input voltage to the integrator is expressed by $(E_1 \cdot E + E_2)$ which is integrated to provide the output voltage $E_0$.

Denoting the time constant of the integrator by $CR$, the output voltage $E_0$ of the integrator I after $t$ seconds will be expressed by an equation $$E_0 = -(t/CR)(E_1 \cdot E_0 + E_2) \quad (1)$$
$$E_0 = -(t/CR \cdot E_2)/1 + (t/CR) \cdot E_1 \quad (2)$$

In this equation, if it is assumed that $(t/CR) \cdot E_1 >> 1$, then $$E_0 \doteq -(E_2/E_1) \quad (3)$$

This means that the output voltage from the integrator I is proportional to the ratio of the dividend signal voltage $E_2$ and the divisor signal voltage $E_1$.

To satisfy the above described condition that $(t/CR) \cdot E_1 >> 1$, it is selected that $t >> CR$ thus increasing the equivalent loop gain, provided that the loop is a negative feedback loop.

As can be clearly understood from equation 3, since the output voltage from the integrator I representing the result of measuring does not include the constant of the integrator I or the like constant it is always possible to provide accurate and stable measurement without being affected by the change in the constant of the integrator.

Where the integrator I is comprised by a Miller integrator utilizing an operational integrator, the effect of changes in the gain of the operational amplifier (if any) is extremely smaller than that of the changes in the constant of the integrator so that such effect can be neglected. Consequently, it is not necessary to control the gain of the operational amplifier in accordance with the signal level as in the prior art device.

As can be noted from forgoing description the novel ratio measuring apparatus can measure accurately and stably the ratio between two input signals with a simple circuit construction comprised by a multiplier and an integrator so that it is applicable to various circuits in which it is required to determine the ratio between two input signals.

FIG. 2 shows a block diagram illustrating the construction of one embodiment of this invention adapted to measure the transmission characteristic of a four terminal circuit network. The measuring apparatus shown in FIG. 2 comprises an oscillator OSC which generates an AC voltage having a variable frequency, and a buffer amplifier BA to amplify the output from oscillator OSC to generate an amplified AC voltage Ei. A four terminal circuit network whose transmission characteristic is to be measured is designated by X. One terminal of the network X is grounded and the network is supplied with the output voltage Ei from the buffer amplifier BA to provide an output voltage Ex. The measuring apparatus further comprises a circuit B comprising an amplifier arranged to provide a selective gain factor, a rectifier circuit $R_1$, a smoothing filter $f1$ and an integrator I. The output voltage $Ex$ from the four terminal circuit network X is multiplied by a predetermined factor in the circuit B and the multiplied voltage is converted into a DC voltage $\overline{Ex}$ by the operation of the rectifier circuit $R_1$ and smoothing filter $f1$, said DC voltage being used as one input signal to the integrator I. A portion of the input voltage $Ei$ to the four terminal circuit network X is rectified by another rectifier circuit $R_2$ and the output DC voltage $\overline{Ei}$ is multiplied by the output voltage $E_o$ from the integrator I in a multiplier M and the product is applied to integrator I as the other input voltage $\overline{Es}$, through a second filter $f2$. Since the DC voltage $Ei$ applied to multiplier M is proportional to the output AC voltage $\overline{Vf}$ from the oscillator OSC, where the output from the oscillator OSC has a DC level $\overline{Vf}$ proportional to the AC voltage $Vf$ this DC level $Vf$ of the output from the oscillator may be supplied to the multiplier M instead of the DC voltage $\overline{Ei}$. The integrator I operates to produce an output voltage $E_o$ corresponding to the integrated value of an algebraic sum of input voltages $\overline{Ex}$ and $\overline{Es}$. This output voltage $E_o$ is fed back to the multiplier M to act as a multiplying signal. The output voltage $E_o$ is also supplied to a display device $D_1$ to display the output voltage $E_o$. A phase measuring circuit P is provided to measure the difference between the input voltage $Ei$ and the output voltage $Ex$ of the four terminal circuit network X and the result of measurement is coupled to another display device $D_2$. As shown by dotted lines the phase measuring circuit P and the display device $D_2$ are not material of this invention but may be provided when desired.

The circuit shown in FIG. 2 operates as follows. As above described, since the integrator I operates to integrate the algebraic sum of DC voltages $\overline{Ex}$ and $\overline{Es}$ to produce output voltage $E_o$ following equation holds, $$E_o = -1/CR \int (\overline{Ex} + \overline{Es}) \, dt \qquad (4)$$

where $CR$ represents the time constant of the integrator I.
Since $Es = Ei \cdot E_o$, equation 4 can be rewritten as $$E_o = -1/CR \int (\overline{Ex} + \overline{Ei} \cdot E_o) \, dt \qquad (5)$$

Assuming now that the transmission characteristic of the four terminal network does not change with time, or the voltage $Ex$ is not a function of time, equation 5 at $t = t1$ becomes $$E_o = -t1/CR \, (\overline{Ex} + \overline{Ei} \cdot E_o) \qquad (6)$$

from this $$E_0 (1 + t1/CR \cdot Ei) = -(t1/CR)\overline{Ex}$$

$$\therefore E_0 = -\frac{\dfrac{t1}{CR}\overline{Ex}}{1 + \dfrac{t1}{CR}\overline{Ei}} \qquad (7)$$

when the relationship between the integration time and the integration time constant is determined to satisfy a condition $t_1 \gg CR$ so as to equivalently increase the loop again then a condition $$\frac{t1}{CR}\overline{Ei} > 1$$

will be satisfied. Then equation becomes $$E_0 \doteq (\overline{Ex}/\overline{Ei}) \qquad (8)$$

Thus, the output voltage $E_0$ of the integrator I represents the ratio between the input voltage $\overline{Ei}$ and the output voltage $\overline{Ex}$ of the four terminal network X. Consequently, the display device $D_1$ represents the voltage transmission ratio of the four terminal circuit network X. If desired, the phase difference between the input voltage $Ei$ and the output voltage $Ex$ of the four terminal circuit network can be measured by the phase measuring circuit P and displayed by the display device $D_2$. Measurements of the voltage transmission ratio and the phase difference of the input and output voltages of the four terminal circuit network can be made at any desired frequency by the adjustment of the output frequency of oscillator OSC.

Thus, the novel measuring apparatus enables measurement of the ratio of input and output voltages of a four terminal circuit network without relying upon any manual operation. Consequently, the time required for measurement can be extremely reduced when compared with prior art apparatus relying upon manual operations. While the novel measuring apparatus operates to measure the ratio between input and output voltages of the four terminal circuit network based on a type of an automatic balancing operation, as all component elements of the apparatus are comprised by solid state elements, the apparatus can operate at a higher speed with higher accuracy and is more durable and reliable than the prior apparatus including an automatic balancing system comprised by such a mechanical element as a servomotor or a slide resistor.

For this reason, the measuring apparatus embodying this invention is useful to measure and test circuit components which are produced on the mass production basis.

FIG. 3 is a circuit diagram showing the circuit arrangement of a modified embodiment of this invention adapted to measure an impedance such as the capacitance, conductance and tan δ of a capacitor. The capacitor to be measured is shown by a reference charactor $Cx$ with an equivalent leakage resistance $\phi x$. To perform the required measurement a reference capacitor $Cs$ and a reference leakage resistor $\phi s$ are provided. An AC voltage from a source of alternating voltage E, a sine wave oscillator for example, is applied, to a pair of multipliers $MX_1$ and $MX_2$ which operate to provide AC voltages respectively proportional to the product of the AC voltage from the source E and DC voltages $E_0$ and $E_0'$ which are negatively fed back to multipliers $MX_1$ and $MX_2$ from the output side of integrators $I_1$ and $I_2$, respectively. These AC voltages are applied respectively to reference capacitor $Cs$ and to reference leakage resistor $\phi s$. A transfer switch S is provided to transfer the input of the multiplier $MX_2$ between the source E and the output from the multiplier $MX_1$. As will be discussed hereinafter, transfer of the switch S is effected when it is desired to measure the value of tan δ. To reverse the polarity of the output voltage from the AC source E, there is provided a polarity reversing amplifier $A_1$ of a gain of unity and the output of this amplifier is coupled to capacitor $Cx$ to be measured. Other terminals of the capacitor $Cx$, reference capacitor $Cs$ and reference leakage resistor $\phi s$ are commonly connected at a juncture J and these elements comprise a transformer bridge. Instead of an actual capacitor, a series combination of an integrator I and a reference resistor $Rs$, shown in FIG. 4, may be used as the reference capacitor $Cs$. More particularly, integrator I provides an AC voltage $jE$ 90° phase advanced with respect to the input AC voltage E. Since the value of current I caused by this output voltage $jE$ is determined by the reference resistor $Rs$ the phase of current I advances 90° with respect to the input voltage in a range in which the frequency of AC voltage E is maintained at a constant value. Thus, the circuit shown in FIG. 4 is equivalent to a capacitor which determines the current by its capacitance. The circuit shown in FIG. 4 may be changed to comprise a reference inductance by adding an inverter INV, which can be used where the impedance element to be measured is an inductance element (FIG. 5).

Referring again to FIG. 3, the voltage at the juncture J is supplied to a pair of modulators $MOD_1$ and $MOD_2$ each comprised by a multiplier. Modulators $MOD_1$ and $MOD_2$ are supplied with AC voltages $E∠90°$ and $E∠0°$, which are 90° out of phase, as modulating signals. Outputs from modulators $MOD_1$ and $MOD_2$ are respectively applied to display devices $D_1$ and $D_2$ through integrators $I_1$ and $I_2$. Thus, the voltage $e$ at the juncture J is amplified by the amplifier $A_2$ and the amplified voltage is modulated by modulators $MOD_1$ and $MOD_2$ and is then integrated by integrators $I_1$ and $I_2$ to provide DC voltages $E_0$ and $E_0'$ which are displayed by display devices $D_1$ and $D_2$. As above described, these DC voltages are also negatively fed back to the multipliers $MX_1$ and $MX_2$, respectively. The loop gains of these two closed loops are selected to be substantially larger than unity to form a sensitive automatic balancing system.

The measuring apparatus shown in FIG. 3 operates as follows. The AC voltage from the multiplier $MX_1$ causes an AC current which is advanced in phase relative to the AC voltage by 90° to flow through the reference capacitor Cs whereas the AC voltage provided by the multiplier $MX_2$ causes a current of the same phase as the AC voltage to flow through the reference leakage resistor $\phi s$. A current 90° advanced in phase relative to the AC voltage from amplifier $A_1$ and a current of 0° phase caused by the leakage resistor $\phi x$ flow through capacitor Cx to be measured. Since the AC voltages applied across the reference capacitor Cs and across the reference leakage resistor $\phi s$ have a polarity opposite to that of the AC voltage applied across capacitor Cx, the 90° out of phase components of the AC current flowing through the reference capacitor Cs and of the AC current flowing through the capacitor Cx to be measured have opposite polarities. The 0° phase component flowing through the capacitor Cx to be measured has a polarity opposite to that of the alternating current flowing through the reference leakage resistor $\phi s$. As a result, an AC voltage e will appear at the juncture J corresponding to the difference of these two AC currents. The AC voltage e comprises two components, that is a 90° out of phase AC voltage proportional to the difference between the capacitances of capacitors Cs and Cx, and an AC voltage of 0° phase and proportional to the difference between a conductance $1/\phi s$ of the reference leakage resistor $\phi s$ and a conductance $1/\phi x$ of the equivalent resistance $\phi x$ of the capacitor Cx to be measured.

The AC voltage e at the juncture J is applied to modulators $MOD_1$ and $MOD_2$ after being amplified by the amplifier $A_2$. Modulator $MOD_1$ functions to multiply the AC output voltage from amplifier $A_2$ with AC modulating signal $E \angle 90°$ to provide a pulsating output voltage having a mean value proportional to the 90° phase component of the AC voltage e appearing at the juncture J. Thus, the modulator $MOD_1$ is equivalent to a synchronous rectifier circuit. Consequently the mean value of the voltage produced by modulator $MOD_1$ is proportional to the difference $(Cs-Cx)$ in capacitances of two capacitors Cs and Cx, and the sign thereof is positive or negative corresponding to the sign of the difference $(Cs-Cx)$. Similarly, modulator $MOD_2$ functions to multiply the AC output voltage from the amplifier $A_2$ with AC modulating signal $E \angle 0°$ to produce a pulsating voltage having a mean value proportional to the 0° phase component of the AC voltage e at the juncture J. Thus, the modulator $MOD_2$ is also equivalent to a synchronous rectifier circuit. The mean value of the latter pulsating voltage is proportional to the difference $(1/\phi s - 1/\phi x)$ between the conductance of the reference leakage resistor $\phi s$ and the conductance of the equivalent leakage resistance $\phi x$ of the capacitor Cx to be measured. The sign of this pulsating voltage is positive or negative corresponding to the sign of the difference $(1/\phi s - 1/\phi x)$. These pulsating voltages are integrated by integrators $I_1$ and $I_2$, respectively, to provide DC output voltages $E_0$ and $E_0'$ which are displayed by display devices $D_1$ and $D_2$ respectively. Voltages $E_0$ and $E_0'$ are also fed back to multipliers $MX_1$ and $MX_2$ to control their AC output voltages.

Supposing now that the capacitance of capacitor Cx to be measured is larger than that of the reference capacitor, that $(Cs - Cx) < 0$ and that the current flowing through reference capacitor Cs is smaller than that flowing through capacitor Cx to be measured, modulator $MOD_1$ will provide a negative voltage having a mean value proportional to the difference between these capacitor currents to produce a positive going DC output voltage $E_0$ from integrator $I_1$. Consequently, the AC output voltage of multiplier $MX_1$ energized by this output voltage $E_0$ will increase whereby to increase the current flowing through the reference capacitor Cs to cause it to balance against the current flowing through the capacitor Cx to be measured. In the case wherein $(Cs - Cx) > 0$ the mean value of the output voltage from the modulator $MOD_1$ becomes positive to decrease the output DC voltage from integrator $I_1$. This results in the reduction of the AC voltage produced by multiplier $MX_1$ to decrease the current flowing through the reference capacitor Cs to cause it to balance against the current through capacitor Cx to be measured.

Where the conductance due to the leakage resistance varies, the DC output voltage from integrator $I_2$ operates to control the multiplier $MX_2$ to perform similar automatic balancing operation.

When the automatic balancing operation is performed to maintain voltage e at the juncture J at the minimum, similar to a well known transformer bridge following equations hold, $$Cx = E_0 \, Cs \qquad (9)$$
$$1/\phi x = E_0' \cdot 1/\phi s \qquad (10)$$

As can be noted from these equations by selecting the capacitance of the reference capacitor Cs and the reference leakage resistor $\phi s$ to have values of suitable units, output voltages $E_0$ and $E_0'$ of integrators $I_1$ and $I_2$ will display direct readings of the values of capacitance and conductance of the capacitor Cx on display devices $D_1$ and $D_2$.

To measure tan $\delta$ of the capacitor Cx, switch S is transferred to apply the output AC voltage from the multiplier $Mx_1$ to the multiplier $MX_2$. When a condition of the automatic balancing is reached under these circumstances the following equations hold:

$$Cx = E_0 \, Cs \qquad (11)$$
$$1/\phi x = E_0 \cdot E_0' \, 1/\phi s \qquad (12)$$

Hence, tan $\delta$ of the capacitor Cx to be measured is expressed by an equation $$\tan \epsilon x = 1/\omega Cx\phi x = 1/\omega E_0 Cs \cdot E_0 \cdot E'_{/}\phi s = E_0' \, 1/\omega Cs\phi s$$

Since $1/\omega Cs\phi s$ represents the tan $\delta$ of the reference capacitor $$\tan \delta x = E_0' \cdot \tan \delta s \qquad (13)$$

In this manner, where the value of tan $\delta$ of the reference capacitor Cs is selected to a suitable unit value the output voltage $E_0'$ will give a direct indication of the value of tan $\delta$ of the capacitor Cx to be measured on the display device $D_2$.

As these equations clearly show, variations in the voltage of the AC source E do not affect in any way the result of measurement.

While above description has been made with reference to the measurement of parameters of a capacitor, measurement of resistance is possible with a circuit as shown in FIG. 6 which is different from the apparatus shown in FIG. 3 in that the capacitor Cx to be measured and the reference leakage resistor $\phi s$ shown in FIG. 3 are substituted by a reference resistor Rs and a resistor Rx to be measured respectively. In the apparatus shown in FIG. 6, upon establishment of a balance condition the following equation holds $$Rx/Rs = E_0'$$

hence $$Rx = E_0' \cdot Rs$$

Thus, by selecting a suitable unit for the value of the reference resistor Rs the output voltage $E_0'$ from integrator $I_2$ directly displays the reading of the resistance of the resistor Rx to be measured on display device $D_2$.

Figure 7:
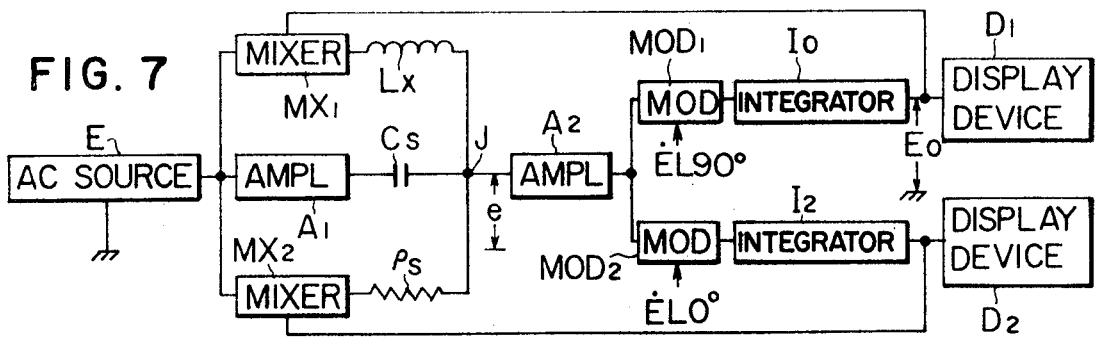

FIG. 7 shows a modified embodiment of this invention adapted to measure inductance. The apparatus shown in FIG. 7 is different from that of FIG. 3 in that reference capacitor Cs and capacitor Cx to be measured are replaced by an inductance Lx to be measured and a reference capacitor Cs, respectively. In the apparatus shown in FIG. 7 upon establishment of a balanced condition the following equation holds, $$\frac{\omega Lx}{\frac{1}{\omega Cs}} = E_0$$

hence $$Lx = E_0 \cdot 1/\omega^2 Cs$$

So long as the frequency is maintained constant and where a suitable unit is selected for the value of $\omega^2 Cs$, the output voltage from the integrator $I_1$ provides a direct reading of the value of inductance Lx to be measured on the display device $D_1$.

FIG. 8 shows another modification of this invention adapted to measure a turn ratio of windings of a transformer. The apparatus shown in FIG. 8 is different from that shown in FIG. 3 in that the reference capacitor Cs and the capacitor Cx to be measured are replaced by transformer windings $L_1$ and $L_2$, respectively. When a condition of automatic balance is established in the apparatus shown in FIG. 8 following relation holds:

$$N1/N2 = E_0$$

Thus, the output voltage from integrator $I_1$ gives a direct reading of the turn ratio of windings $L_1$ and $L_2$ on the display device $D_1$.

As diagrammatically illustrated in FIG. 9, the circuits of previous embodiments including modulators $MOD_1$ and $MOD_2$ and integrators $I_1$ and $I_2$ may be substituted by integrators $I_1$ and $I_2$ having switches $S_1$ and $S_2$ on their input sides. Switches $S_1$ and $S_2$ are operated in synchronism with the input signal voltage but with a phase difference of 90°. Thus, each of them closes for a time interval corresponding to one half cycle of the input signal voltage. Thus by suitably selecting the opening and closing timings of these switches $S_1$ and $S_2$ with reference to the input signal voltage, the output voltages $E_0$ and $E_0'$ from integrators $I_1$ and $I_2$ will be made proportional to 90° out of phase components contained in the input signal voltage.

Thus, as the measuring apparatus of this invention is solely comprised by solid state elements it includes only a primary delay element and is free from an inertia or backlash of gears of a servomotor, or friction of a slide resistor which are commonly utilized in mechanical servosystems and cause hunting as well as unstable operation. Thus the apparatus ensures high speed and highly accurate automatic balancing operation or measuring operation and is durable and reliable. Accordingly, the novel apparatus is suitable for use to perform automatic testing and measurements of various impedance elements produced on the mass production basis.

What is claimed is:

1. A ratio measuring apparatus providing an output proportional to the ratio of a dividend signal to a divisor signal, comprising a multiplier having a pair of inputs, means to apply said divisor signal to one input of said multiplier, an integrator having a pair of inputs means to apply said dividend signal to one input of said integrator, means to apply the output from said multiplier to the other input of said integrator, means to feed back the output from said integrator to said multiplier and means to measure the output from said integrator, said output comprising the desired ratio.

2. The ratio measuring apparatus as claimed in claim 1 wherein a four terminal circuit network having an input voltage applied thereto and providing an output voltage is connected to said ratio measuring apparatus in such manner as to apply its output voltage to one input of said integrator as said dividend signal and its input voltage to one input of said multiplier as said divisor signal, a portion of the output of said integrator is negatively fed back to said multiplier and the output from said multiplier is applied to the other input of said integrator whereby to determine the transmission characteristic of said four terminal circuit network.

3. An impedance measuring apparatus comprising a source of alternating current, a multiplier effecting multiplication of an AC voltage from said source and a negative feedback voltage to provide an output AC voltage, a first impedance element energized by said output AC voltage from said multiplier, a second impedance element energized by the AC voltage of said source, a synchronous rectifier circuit responsive to a signal proportional to the difference between currents flowing through said first and second impedance elements, an integrator operative to integrate the output from said synchronous rectifier circuit and means responsive to the output from said integrator to apply said negative feedback signal proportional to said output from said integrator to said multiplier so as to establish the condition of automatic balance.

4. The apparatus as claimed in claim 3 wherein said first impedance element is comprised by a reference capacitor, said second impedance element is comprised by a capacitor to be measured, and including a second multiplier, said second multiplier being responsive to a second negative feedback voltage and selectively either the voltage of said source of alternating current or the output voltage from said first mentioned multiplier to produce an AC voltage proportional to the product of the selected voltage and said second negative feedback voltage, a reference leakage resistance element responsive to the output from said second multiplier, a synchronous rectifier circuit coupled to be responsive to a signal proportional to the difference between the current flowing through said reference leakage resistance element and the leakage current flowing through said capacitor to be measured, a second integrator operative to integrate the output from said synchronous rectifier circuit and the output voltage from said second integrator is applied to said second multiplier as said second negative feedback voltage to establish a condition of automatic balance.

5. The impedance measuring apparatus as claimed in claim 3 wherein said first impedance element is comprised by a resistance element to be measured and said second impedance element is a reference resistance element whereby to determine the resistance value of said first mentioned resistance element.

6. The impedance measuring apparatus according to claim 3 wherein said first impedance element is comprised by an inductance element to be measured and said second impedance element is comprised by a reference reactance element whereby to determine the inductance of said inductance element.

7. The impedance measuring apparatus according to claim 3 wherein said first and second impedance elements are comprised by transformer windings whereby to determine the turn ratio of said transformer windings.

* * * * *

PO-1050
(5/69)

UNITED STATES PATENT OFFICE
CERTIFICATE OF CORRECTION

Patent No. 3,652,930          Dated     March 28, 1972

Inventor(s)   Takashi Sugiyama; Satoshi Kurata; Hisao Nakane

It is certified that error appears in the above-identified patent and that said Letters Patent are hereby corrected as shown below:

Column 3, line 35, "Es=Ei.$E_o$" should be -- $\overline{Es}=\overline{\overline{Ei}}.E_o$ --

Column 4, line 20,
Column 4, line 21,
Column 4, line 31,
Column 4, line 40,
Column 5, line 5,
Column 5, line 7,
Column 5, line 10,     "$\phi s$" should be -- $fs$ --
Column 5, line 17,
Column 5, line 25,
Column 5, line 48,
Column 5, line 49
Column 6, line 12,
Column 6, line 40, Column 5, line 23, "$1/\phi s$" should be -- $1/fs$ --

Column 5, line 24, "$\phi s$" should be -- $fs$ --
Column 5, line 24, "$1/\phi x$" should be -- $1/fx$ --

Column 5, line 52, "$(1/\phi s-1/\phi x)$" should be -- $(1/fs-1/fx)$ --

Column 6, line 9, "$1/\phi x=E_o'.1/\phi s$" should be -- $1/fx=E_o'.1/fs$ --

Column 6, line 22, "$1/\phi x=E_o.E_o'1/\phi s$" should be -- $1/fx=E_o.E_o'.1/fs$ --

Column 6, line 26, "$\tan\epsilon x=1/\omega Cx\phi x=1/\omega E_o Cs.EoE'$, $\phi s=E_o'1/\omega Cs\phi s$" should be -- $\tan fx=1/\omega Cxf=1/\omega E_o Cs.EO.EO'/fs = E_o' 1/\omega Cs fs$ --

Column 6, line 26, "$1/\omega Cs\phi s$" should be -- $1/\omega Cs fs$ --.

Signed and sealed this 28th day of November 1972.

(SEAL)
Attest:

EDWARD M. FLETCHER, JR.                ROBERT GOTTSCHALK
Attesting Officer                          Commissioner of Patents